United States Patent
Choi

Patent Number: 6,067,631
Date of Patent: May 23, 2000

[54] TIME SETTING DEVICE AND METHOD OF AN OPERATING SYSTEM IN A POWER SAVING MODE

[75] Inventor: Seung-Beom Choi, Seoul, Rep. of Korea

[73] Assignee: Samsung Electronics Co., Ltd., Kyungki-do, Rep. of Korea

[21] Appl. No.: 09/217,806

[22] Filed: Dec. 22, 1998

Related U.S. Application Data

[63] Continuation-in-part of application No. 08/701,802, Aug. 26, 1996, abandoned.

[30] Foreign Application Priority Data

Aug. 25, 1995 [KR] Rep. of Korea ........................ 95-26636

[51] Int. Cl.[7] ........................................... G06F 1/04
[52] U.S. Cl. ........................... 713/500; 713/503; 713/601
[58] Field of Search ................................. 713/400, 500, 713/502, 503, 601, 322

[56] References Cited

U.S. PATENT DOCUMENTS

| | | |
|---|---|---|
| 4,295,194 | 10/1988 | Darden et al. . |
| 4,303,850 | 12/1981 | Juhasz et al. . |
| 4,466,074 | 8/1984 | Jindrick et al. . |
| 4,575,848 | 3/1986 | Moore et al. . |
| 4,589,093 | 5/1986 | Ippolito et al. . |
| 5,016,219 | 5/1991 | Nolan et al. . |
| 5,315,499 | 5/1994 | Bilas et al. . |
| 5,655,127 | 8/1997 | Rabe et al. . |

*Primary Examiner*—Dennis M. Butler
*Attorney, Agent, or Firm*—Robert E. Bushnell, Esq.

[57] ABSTRACT

A time setting device for setting time in a computer based operating system. The time setting device utilizes a random access memory (RAM) in which an operating system is loaded and the operation thereof is performed, a real time clock (RTC) for tracking real time and the date, and storing corresponding data in a corresponding register, a power management system controller for sensing whether an activity signal according to data input or reception/transmission of data is generated, and generating a clock driving signal according to a sensed result, a clock generator for outputting a clock signal according to the clock driving signal generated by the power management system controller, a central processing unit operated according to the clock signal output by the clock generator, and a device driver for resetting the time and the date of the operating system according to the time and date measured by the real time clock after determining that the central processing unit is in a stop clock state when the time and the date measured in the operating system is delayed when compared to the time and the date measured by the real time clock after reading the real time clock for the time and the date, and reads the time and the date measured by the real time clock and the operating system at predetermined time periods.

9 Claims, 3 Drawing Sheets

TIME SETTING DEVICE AND METHOD OF AN OPERATING SYSTEM IN A POWER SAVING MODE

CROSS-REFERENCE TO RELATED APPLICATIONS

This application is a continuation-in-part of Applicant's U.S. Ser. No. 08/701,802, filed in the U.S. Patent & Trademark Office on Aug. 26, 1996, now abandoned.

CLAIM OF PRIORITY

This application makes reference to, incorporates the same herein, and claims all benefits accruing under 35 U.S.C §119 and §120 from an application entitled Time Setting Device And Method Of An Operating System In A Power Saving Mode earlier filed in the Korean Industrial Property Office on Aug. 25, 1995, and there duly assigned Serial No. 95-26636 by that Office.

BACKGROUND OF THE INVENTION

1. Field of the Invention

The present invention relates to a time setting device and method of an operating system in a power saving mode, and, more particularly, to a time setting device and method for setting the time and date in a central processing unit restarted after having its clock stopped during a power saving mode of the operating system.

2. Description of the Prior Art

Recently design efforts have sought to provide energy saving features to the functional aspects of computers. Accordingly, power saving functions have been developed and applied to the operational systems of computers. Presently, most computer systems use a power management technique havng a power saving feature dedicated to reducing the consumption of electrical power during a standby mode when the computer system is not operating upon data. Generally, the motor of a hard disc drive is stopped in order to reduce the power consumed during the standby mode, and the chipsets in the computer system are set into a power saving mode such as a standby mode or a suspend mode. It is difficult, however, to satisfy power of less than 30 Watts, a standard established by the Environmental Protection Agency, without stopping the clock of the central processing unit such as a 486 DX or a P5 pentium microprocessor, and thereby placing the chipset for the central processing unit into a power saving mode with its clock stopped.

Accordingly, when the central processing unit returns to a normal state by an activity through an input operation by a keyboard or a mouse, all of the operations of the computer return to a previous state with the central processing unit being returned to an operating state. I have found that conventional power management schemes for a computer delay the operational time and date of the operating system by as much as the time interval during which the central processing unit was stopped because the commands for the central processing unit are not performed during the powering saving mode and consequently, the time keeping function of the operating system is stopped while the central processing unit is in the power saving mode. Recent power management schemes such as the Computer-Controlled Circuit Breaker Energy Management Arrangement Having Reliable Memory And Clock, U.S. Pat. No. 5,315,499 of Ron J. Bilas, et alii, have sought to use a charged capacitor to maintain continuous operation of a real time clock circuit during power outages. This scheme also depends however, upon operation of the central processor unit to periodically store images of the real time during normal operation.

SUMMARY OF THE INVENTION

Accordingly, it is an object of the present invention to improve the time keeping function for computers subjected to power saving cycles.

It is another object to avoid malfunction attributable delay incurred in the time keeping functions during a power saving cycle of a computer system, by providing a time setting device and process for an operating system subjected to power saving cycles.

It is still another object to provide a time setting system capable, when returning a central processing unit to its operational state, detecting and correcting errors in operational times and dates experienced while the central processing unit was in a power saving cycle.

These and other objects may be attained with a time setting device for an operating system having a power saving mode which utilizes a random access memory (RAM) in which an operating system is loaded and the operation thereof is performed, a real time clock (RTC) for tracking real time and the date, and storing corresponding data in a corresponding register, a power management system controller for sensing whether an activity signal according to data input or reception/transmission of data is generated, and generating a clock driving signal according to a sensed result, a clock generator for outputting a clock signal according to the clock driving signal generated by the power management system controller, a central processing unit operated according to the clock signal output by the clock generator, and a device driver for resetting the time and the date of the operating system according to the time and date measured by the real time clock after determining that the central processing unit is in a stop clock state when the time and the date measured in the operating system is delayed when compared to the time and the date measured by the real time clock after reading the real time clock for the time and the date, and reads the time and the date measured by the real time clock and the operating system at predetermined time periods.

According to another aspect of the present invention, after a return to a normal mode from a power saving mode, the time setting device reads the time and the date measured by a real time clock, and the time and the date set in an operating system, and, using the time and the date measured by the real time clock, resets the time and the date set in the operating system when the time and the date set in the operating system is different from the time and the date measured by the real time clock.

Additional objects and advantages of the invention are set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Reference will now be made in detail to a preferred embodiment of the present invention, an example of which is illustrated in the accompanying drawings.

Figure 1:
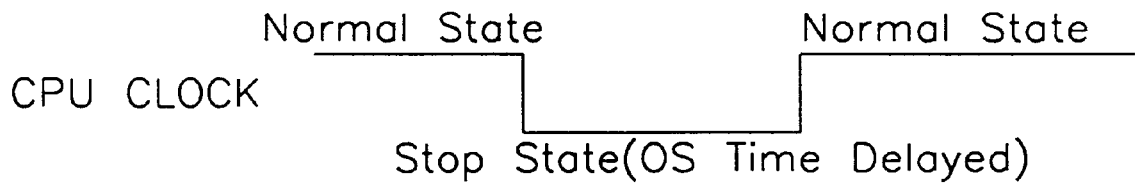
FIG. 1 is a view illustrating clock states for a central processing unit of a computer system.
Figure 2:
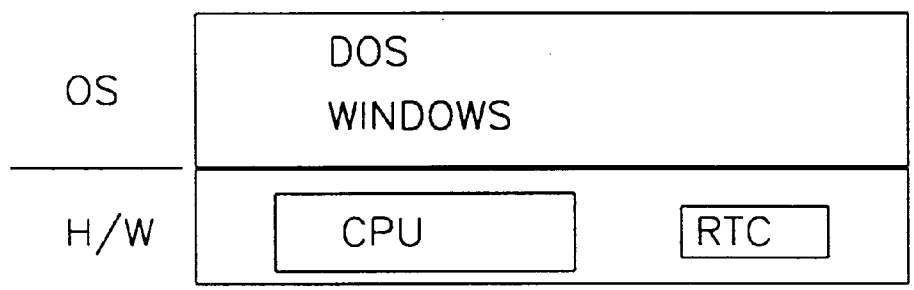
FIG. 2 is a view illustrating a relation between a computer hardware structure and an operating system.
Figure 3:
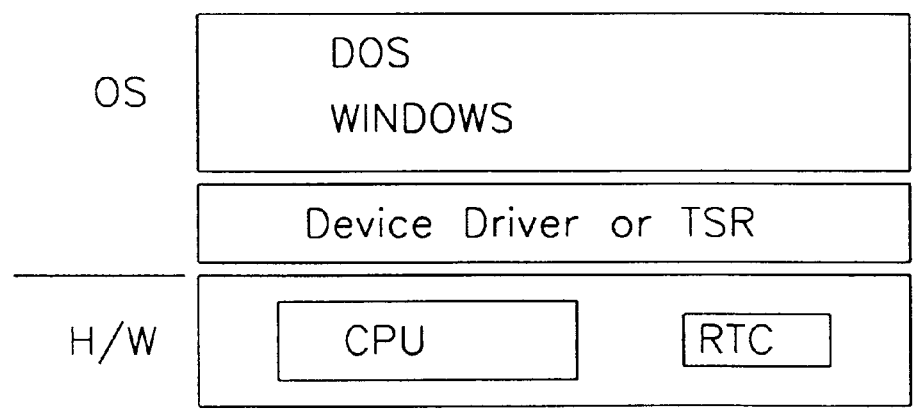
FIG. 3 is a view illustrating a device driver mounted between the computer hardware structure and the operating system according to a preferred embodiment of the present invention.

FIG. 1 illustrates a normal clock state and a stopped clock state of a central processing unit (CPU). In the stopped clock state the time keeping function of the operating system OS is time delayed until the central processing unit returns to the normal clock state. FIG. 2 illustrates the relation between a computer hardware structure H/W and the operating system OS. The hardware structure H/W utilizes a central processing unit and a real time clock, whereas the operating system OS utilizes, but is not limited to, the DOS and WINDOWS operting systems. FIG. 3 shows a device driver, or TSR, mounted between the computer hardware structure H/W and the operating system OS of FIG. 2.

Figure 4:
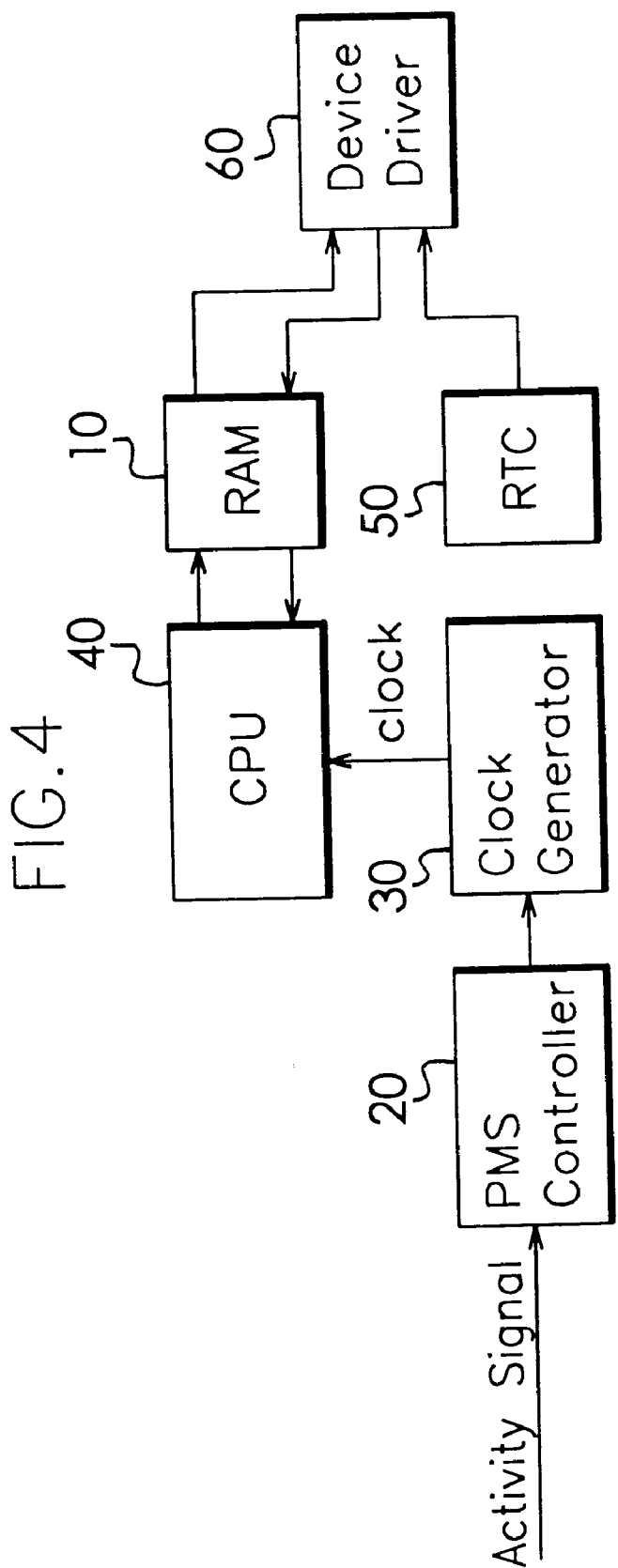
FIG. 4 is a block diagram illustrating a structure of a time setting device of an operating system in a power saving mode according to a preferred embodiment of the present invention.

FIG. 4 illustrates the structure of a time setting device of a computer's operating system having a power saving mode according to a preferred embodiment of the present invention. The time setting device comprises a random access memory (RAM) 10 in which operating system OS is loaded and from which the operation thereof is performed, a power management system controller 20 senses whether an activity signal is generated and generates a clock driving signal according to a sensed result, a clock generator 30 outputs a clock signal according to the clock driving signal generated by power management system controller 20, a central processing unit (CPU) 40 is time controlled according to the clock signal output from clock generator 30, and a device driver 60 resets the time and the date of the operating system according to the time and the date measured by a real time clock (RTC) 50 when the time and the date measured in the operating system is delayed, due to the stop state of the central processing unit clock, when compared to the time and the date measured by RTC 50, wherein the time and the date measured by the RTC 50 and the operating system are read at predetermined time periods. As described above, in addition to that the time of the operating system being reset by the device driver, the embodiments use of a terminal and stay resident (TSR) is also possible.

The operation of the time setting device of an operating system in a power saving mode according to the preferred embodiment of the present invention made by the above-mentioned structure is explained as follows. When there is no input after a predetermined time period of an activity signal such as that input by a keyboard or a mouse, or by data reception/transmission via a modem or a facsimile, power management system controller 20 prevents power consumption by stopping the operation of central processing unit 40 by stopping the clock signal applied to central processing unit 40. Since the time and the date of the operating system are referenced to indicate when a file is produced or when a user makes changes the content of the file by using a computer, a system may malfunction when the time of the operating system is delayed due to a power saving function which stops central processing unit 40. The time setting device of an operating system in a power saving mode according to the preferred embodiment of the present invention prevents a malfunction due to time delay by setting the time and the date of the operating system according to the time and date read from RTC 50.

Figure 5:
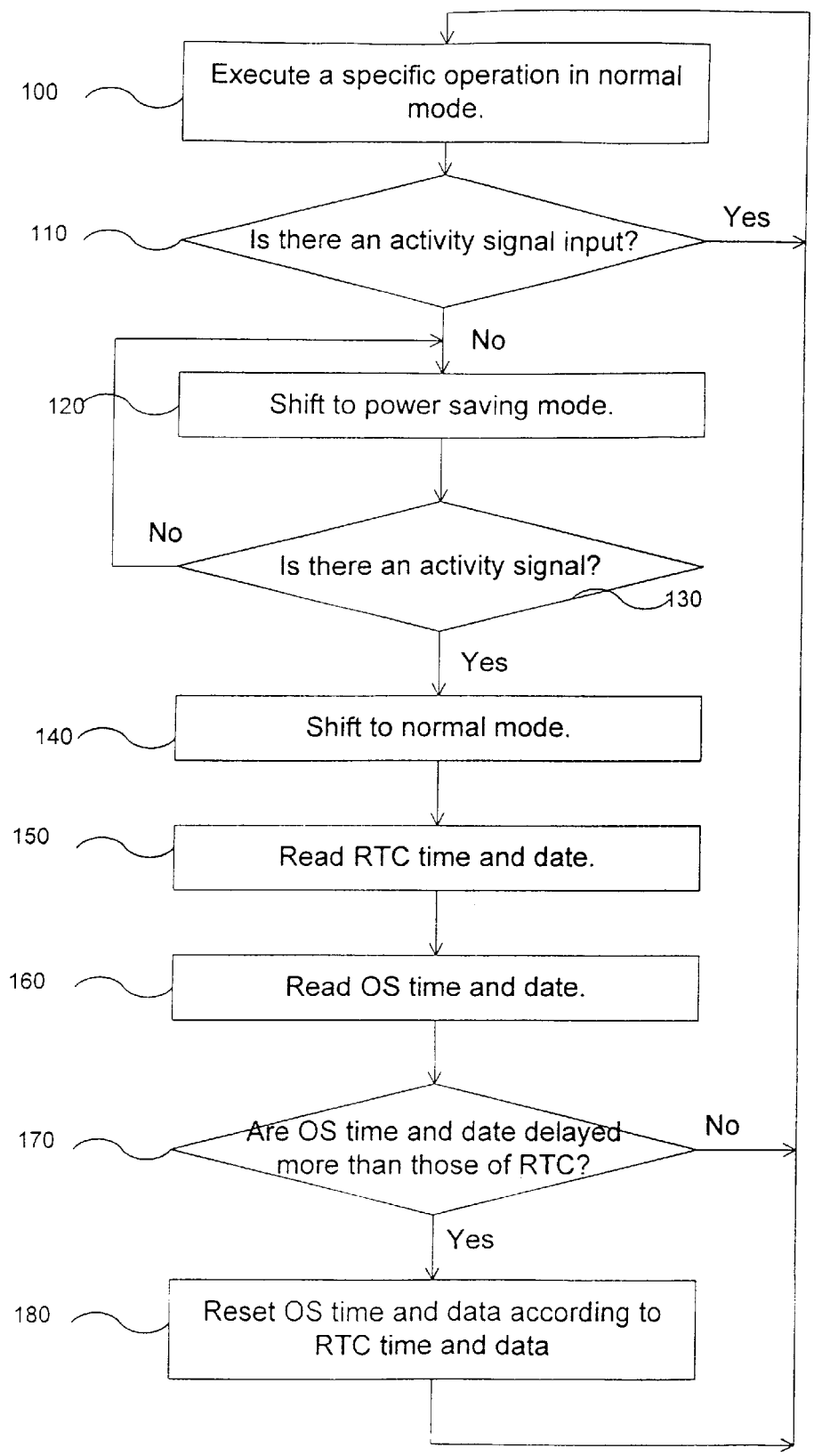
FIG. 5 is a flowchart of steps in a method for controlling a time setting device of an operating system when changing from a power saving mode to a normal mode according to a preferred embodiment of the present invention.

Referring now to FIG. 5, when the computer system is running in a normal mode it executes a specific operation (e.g., a computer program) at step 100. At this time, power management system controller 20 senses, in step 110, whether an activity signal is generated and generates a clock driving signal when it is determined that an activity signal is generated and returns to step 100. If it is determined in step 110 that no activity signal has been generated in a predetermined time period the computer system shifts to a power saving mode in step 120. In step 130, power management system controller 20 again checks for an activity signal and returns to step 120 when no activity signal is detected. In the power saving mode, clock generator 30 stops the clock signal supplied to CPU 40, and the measurement of the time of the operating systems stops. Accordingly, during the power saving mode, the time of the operating system is delayed compared to time measured by RTC 50. When power management system controller 20 detects an activity signal in step 130, the computer system shifts from the power saving mode to the normal mode in step 140. While in the normal mode device driver 60 reads the time and date of the operating system, in step 160, and then, in step 170, compares the time and date measured by RTC 50 and the time and date of the operating system to determine whether the time and date of the operating system is delayed when compared to the time and date of RTC 50. When it is determined in step 170 that there is no delay the process returns to step 100. When it is determined in step 170 that there is a delay, device driver 60 resets the time and date of the operating system to be in synchronization with the time and date of RTC 50, and then returns to step 100.

Accordingly, as discussed above, when there is no activity signal input to power management system controller 20 for a predetermined time, power management system controller 20 outputs a disable signal to clock generator 30. Clock generator 30 stops the clock signal supplied to central processing unit 40 in response to the disable signal and the operation of central processing unit 40 is stopped, thus the measurement of the time of the operating system stops. Accordingly, when the clock of central processing unit 40 is in a stop state, the measurement of time of the operating system stops, thereby delaying the time of the operating system as compared to that of time measured by RTC 50.

Therefore, since a malfunction may occur in a program carried out according to the time settings when the time of the operating system does not correspond to that of the real time measured by RTC 50 as described above, device driver 60 sets the time of the operating system according to the real time measured by the RTC 50.

As described above, according to the present invention, at the time operating mode of the computer system changes from the power saving mode to the normal mode (not during a power on/off operation nor a reset operation) the time and date of the operating system are reset to correspond to the time and date of the real time clock.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A time setting device of an operating system in a computer system having a power saving mode and a normal mode of operation, said device comprising:
    a random access memory for storing said operating system;
    a real time clock for providing representations of real time and date;
    a power management system controller for generating a clock driving signal in said normal mode and stopping said clock driving signal from being generated in said power saving mode;
    a clock for generating a clock signal in response to said clock driving signal;
    a central processing unit for measuring time and date of said operating system in response to said clock signal and, in response to no clock signal being generated during said power saving mode, being shut down; and
    a device driver for comparing, after a change from said power saving mode to said normal mode, said time and date measured by said central processing system to said real time and date provided by said real time clock, said device driver resetting said time and date of said operating system according to said real time and date provided by said real time clock when said time and date of said operating system is delayed due to said central processing unit being shutdown during said power saving mode.

2. The time setting device as set forth in claim 1, wherein said power management system controller stops generating said clock driving signal when no activity signal is sensed after a predetermined time period during said normal mode.

3. The time setting device as set forth in claim 2, further comprised of:
    said clock stopping the generation of said clock signal when said power management system controller stops generating said clock driving signal; and
    said central processing unit shutting down and delaying the measuring of said time and date of said operating system when said clock stops generating said clock signal.

4. The time setting device as set forth in claim 3, further comprised of:
    said device driver reading said real time and date provided by said real time clock and said time and date of said operating system every said predetermined time period.

5. The time setting device as set forth in claim 1, further comprised of:
    said device driver reading said real time and date provided by said real time clock and said time and date of said operating system every predetermined time period.

6. A method of a time and date setting device for setting time and date of an operating system in a computer system having a power saving mode, said method comprising the steps of:
    checking for an activity signal generated in response to an input by a keyboard or a mouse, or by data reception/transmission via a modem;
    generating a clock driving signal when said activity signal is detected;
    generating a clock signal in response to said clock driving signal;
    measuring, in a central processing unit, said time and date of said operating system in response to said clock signal;
    stopping said step of generating said clock driving signal when said activity signal is not detected within a predetermined time period and switching from said normal mode to said power saving mode;
    stopping said step of generating said clock signal when said step of generating said clock driving signal is stopped;
    stopping said step of measuring said time and date of said operating system and shutting down said central processing unit when said step of generating said clock signal is stopped;
    rechecking for said activity signal during said power saving mode;
    switching to said normal mode from said power saving mode when said activity signal is detected during said rechecking step;
    reading real time and date provided by a real time clock and reading said time and date measured by said central processing unit after switching from said power saving mode to said normal mode;
    comparing said real time and date provided by said real time clock with said time and date measured by said central processing unit to obtain a comparison result; and
    setting said time and date of said operating system to said real time and date when said comparison result indicates that said time and date measured by said central processing unit is delayed.

7. The method as set forth in claim 6, further comprising the step of:
    executing a specific operation in said normal mode when said comparison result indicates that said time and date measured by said central processing unit is not delayed.

8. A method setting a date of an operating system in a computer system having a power saving mode and a normal mode of operation, said method comprising the steps of:
    checking for an activity signal generated in response to an input by a keyboard or a mouse, or by data reception/transmission via a modem;
    generating a clock driving signal when said activity signal is detected;
    generating a clock signal in response to said clock driving signal;
    measuring, in a central processing unit, said date of said operating system in response to said clock signal;
    switching to said power saving mode and stopping said step of generating said clock driving signal when said activity signal is not detected within said predetermined time period;

stopping said step of generating said clock signal when said step of generating said clock driving signal is stopped;

stopping said step of measuring said date of said operating system and shutting down said central processing unit when said step of generating said clock signal is stopped;

remaining in said power save mode until said activity signal is detected during said power saving mode;

switching to said normal mode and reading a real date provided by a real time clock when said activity signal is detected during said power saving mode;

reading said date measured by said central processing unit;

comparing said real date provided by said real time clock with said date measured by said central processing unit to obtain a comparison result; and setting said date of said operating system to said real date when said comparison result indicates that said date measured by said central processing unit is delayed.

9. The method as set forth in claim 8, further comprising the step of:

performing a specific operation in said normal mode when said comparison result indicates that said date measured by said central processing unit is not delayed.

* * * * *